June 11, 1968    L. M. CARPENTER    3,387,514
WIRE STRIPPER
Filed Aug. 4, 1967                          2 Sheets-Sheet 1
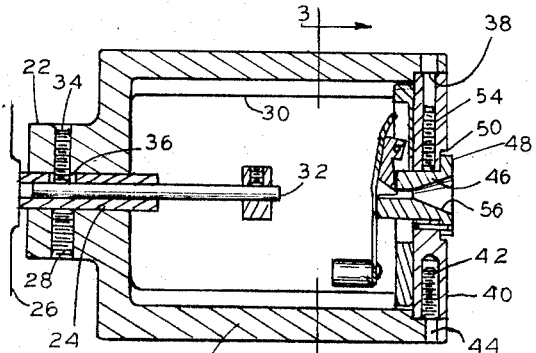
FIG. 1
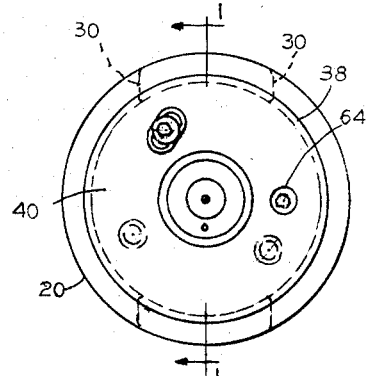
FIG. 2
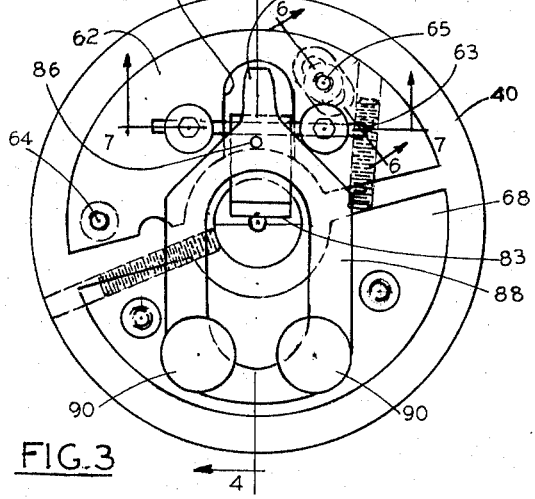
FIG. 3
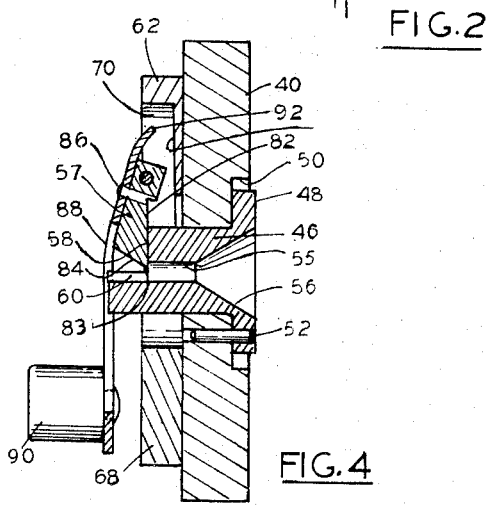
FIG. 4
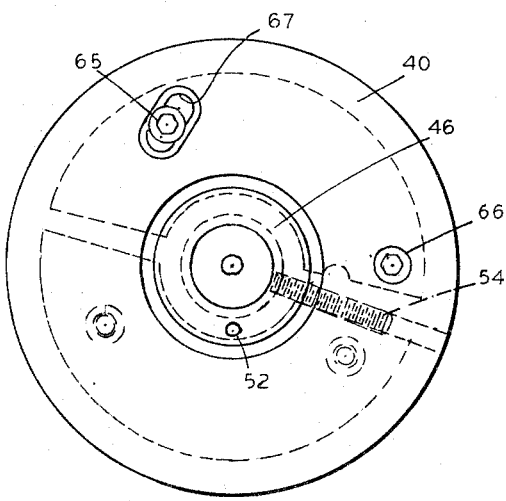
FIG. 5
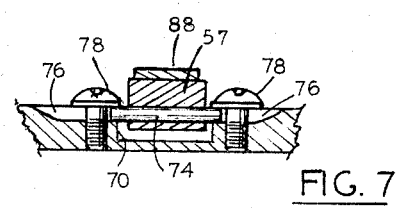
FIG. 7
FIG. 6
INVENTOR.
LOUIS M. CARPENTER
BY
ATTORNEY June 11, 1968  L. M. CARPENTER  3,387,514
WIRE STRIPPER Filed Aug. 4, 1967   2 Sheets-Sheet 2

INVENTOR.
LOUIS M. CARPENTER.
BY
ATTORNEY

United States Patent Office 3,387,514
Patented June 11, 1968

3,387,514
WIRE STRIPPER
Louis M. Carpenter, 6900 Highbridge Road,
Fayetteville, N.Y. 13066
Filed Aug. 4, 1967, Ser. No. 658,401
10 Claims. (Cl. 81—9.51)

ABSTRACT OF THE DISCLOSURE

A rotary wire stripper employing a single blade in connection with a stepped guide sleeve to support the wire as the blade cutting edge moves into stripping position along the arc terminating at the guide sleeve step, or in which opposed blades are employed in conjunction with a slidable wire guide sleeve axially movable in a bushing, the sleeve acting to move the cutting edges of both blades on opposite like arcs terminating at the bushing, and in which the blade or blades are urged toward their terminal positions by centrifugal force.

This invention relates to apparatus for stripping insulation from the ends of electrical conductors preparatory to establishing electrical connections between wire ends and terminals.

Insulation is applied to conductors for the purpose of providing permanent insulation and protection. The better the insulation, as respects its permanence, the greater is the difficulty of removing such insulation, as is necessary to establish electric connections.

The present invention is directed to a rotary power driven wire stripper employing a single or pair of cutting blades, either actuated to move on an arc by the insertion of a wire end to be stripped, and the withdrawal of such wire during stripping, the insertion, where a pair of blades are employed, being assisted by an axially movable guide sleeve which moves the blades on arcs to accept the conductor end, and supports the conductor adjacent the blade cutting edges continuously as withdrawal and stripping takes place. The movement of the blade or blades during insertion of the wire is opposed by a yielding force resulting from centrifugal force derived from rotation of the stripping apparatus or other means, and such yielding assists in the insulation stripping operation which occurs with the withdrawal of the insulated conductor from the apparatus.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts;

FIGURE 1 is a sectional view through the rotary head portion of a single blade wire stripper with a fragmentary showing of the drive motor, the section being taken on the line 1—1 of FIGURE 2;

FIGURE 2 is a front end elevational view of the wire stripper of FIGURE 1;

FIGURE 3 is an enlarged elevational view of the face plate from the rear;

FIGURE 4 is an enlarged sectional view taken on the line 4—4 of FIGURE 3;

FIGURE 5 is an enlarged front view of the face plate;

FIGURE 6 is a fragmentary sectional view taken on the line 6—6 of FIGURE 5;

FIGURE 7 is a fragmentary sectional view taken on the line 7—7 of FIGURE 3;

Figure 8:
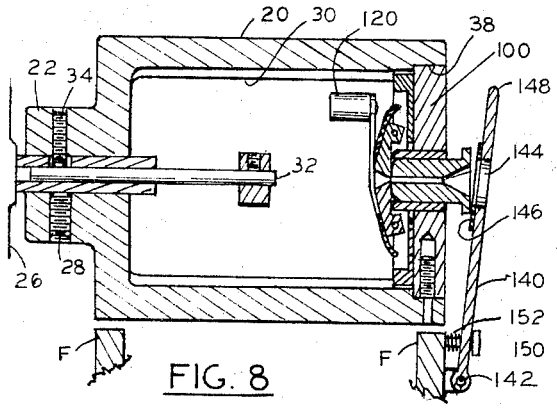
FIGURE 8 is a sectional view through the rotary head portion of a two blade wire stripper with a fragmentary showing of the base and drive motor and taken on the line 8—8 of FIGURE 9.

Referring to FIGURE 1, there is shown a rotatable housing 20 having a hub 22 mounted on the shaft 24 of a small motor indicated at 26, and secured thereto by a setscrew 28, the housing having opposed openings 30 to provide access, and to permit slugs of insulation to escape. The motor shaft is counterbored to receive an adjustable wire abutment 32, the same being held in any selected position by the setscrew 34 extending through a radial aperture 36 in the motor shaft.

The front end of the housing 20 is provided with an annular recess 38 to receive a circular face plate 40, which is secured in place by a radial setscrew 42 that is adapted to be threaded outwardly into engagement with the internal wall of the recess by an Allen type wrench inserted through the small aperture 44 in the housing recess wall. The face plate is provided with a coaxial bore to receive a wire guide sleeve or bushing 46, the guide sleeve having a flange 48, disposed in an annular recess 50, the guide sleeve flange having an aperture for engagement with a pin 52, and being secured in place by a radial setscrew 54. The sleeve has a flared opening 56 in the front and a cylindrical aperture 55 to closely receive the outside diameter of insulated wire, from which the insulation is to be stripped. Such sleeve on its inside end is stepped to provide clearance for a pivoted blade 57, and to provide a blade abutment face 58, and an arcuate trough 60, of sufficient length to support the end of an insulated wire for the length of the arcuate engagement of the blade edge in the insulation, as the blade pivots to a final position in the stripping of the insulation from the wire end.

On the inside face of the plate is an adjustable segmental shaped blade block 62 pivoted to the plate as at 64 by a screw 66. Such block is counter balanced by a similar shaped block 68 affixed to the inside face of the plate 40. Pivoted in a slot or recess 70 in the block 62 is the blade 57, the blade being pivoted on a pintle 74 held in an interrupted groove 76 by screws 78. The axis of the pivot of the blade lies in a plane transverse of the axis of the guide bushing aperture, and extending through the plane of the abutment face 58 of the guide bushing.

The blade 57, having a flat face 82 coplanar with the axis of pintle 74, and a clearance face 84 disposed at an angle thereto has affixed thereto by a rivet 86, an operating frame 88, which extends to the opposite side of the axis of the guide bushing, and is provided with suitable weights 90 affixed thereto. The other end of the frame has a lightweight tongue 92 which is adapted to limit the angle through which the blade may swing away from its position against the abutment face 58 on the guide sleeve, the tongue 92 engaging the bottom of the recess 93 when the blade swings open to its limit.

When the housing is rotated, as for example at about 1750 r.p.m., the weights 90 urge the blade 57 into engagement with the guide sleeve abutment 58, and yieldingly permit the blade to be moved away from the abutment upon the insertion of the end of insulated wire through the guide sleeve aperture. For the purpose of stripping various sizes of insulated wire, the guide sleeve is interchangeable for other guide sleeves having the desired aperture diameter. Such substitution is readily made by loosening the setscrew 54 which permits the removal of the sleeve. The cutting edge of the blade normally lies partially across the aperture 55 of the guide sleeve, the cutting edge being spaced from the bottom of the trough 60 by approximately the radial thickness of the insulation plus the diameter of the conductor. When correctly adjusted, by actuating setscrew 63, the clamp screw 65 in slot 67 is tightened to hold the adjustment.

When the end of a conductor is to be stripped, its end is manually inserted through the rotating guide sleeve aperture, until the end reaches the stop 32. In this procedure, the blade 57 is pushed away from the sleeve abutment face 58 against centrifugal force of weights 90 tending to return the blade, thus permitting the wire end to reach the stop 32. Upon reaching the stop, the wire is withdrawn, causing the blade cutting edge 83 to cut into the insulation as it rotates around the manually held conductor. Once the blade cuts into the conductor by centrifugal force, the further withdrawal of the conductor cooperates with centrifugal force to swing the blade toward the abutment. The clearance face 84 of the blade 57 crowds the insulation slug to be stripped, and loosens it from the conductor, and on withdrawal, the conductor is stripped from the conductor end to the point at which the blade first cut into the insulation, under the combination of centrifugal force and the manual withdrawal movement of the wire.

Figure 9:
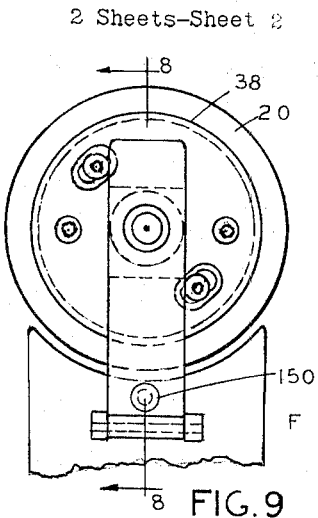
FIGURE 9 is a front view of the rotary head and a fragmentary part of the base.
Figure 10:
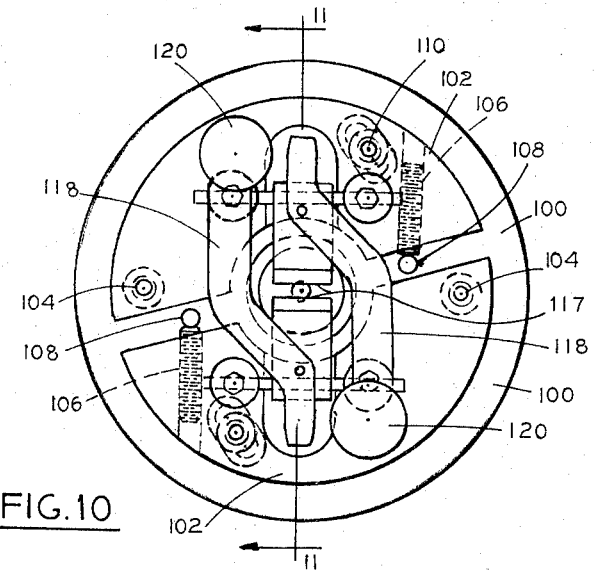
FIGURE 10 is an enlarged elevational view of the free plate from the rear.
Figure 11:
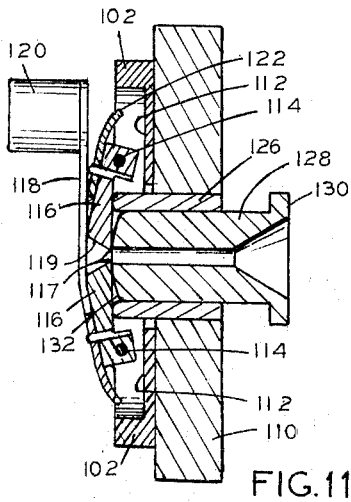
FIGURE 11 is an enlarged sectional view taken on the line 11—11 of FIGURE 10.
Figure 12:
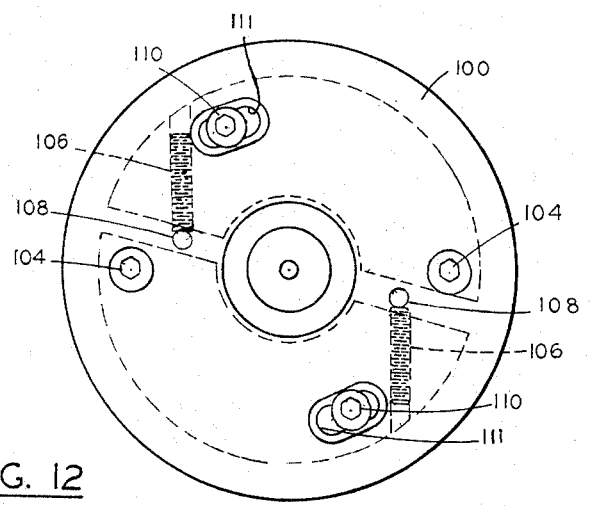
FIGURE 12 is an enlarged front view of the face plate.

In a twin blade version of the invention as shown in FIGURES 8–12, the face plate 100 is provided with a pair of identical segmental plates 102 each pivoted to the face plate as at 104. Each segment is provided with a setscrew 106 bearing against a pin 108 set in the face plate, and once adjusted, each segment is locked by the screws 110 extending through slots 111. Each segment is provided with a blade recess 112 having a plate pivot pintle 114 and blade 116. Each blade is provided with an arm 118 extending to the other side of the rotational axis of the face plate, and to which is affixed an inertia weight 120. The other end of the arm is provided with a curved tongue 122 which engages the bottom of the recess 112 to limit the angle through which the cutting edges 124 of the blades 116 may pivot away from the face plate 100.

The face plate is provided with an oilite bushing 126 which forms an abutment in the plane of the blade pivot pintles 114 and the blade cutting edges 117, when the blades abut the bushing. A guide sleeve 128 slides axially and freely in the bushing 126. The guide sleeve 128 has a flange 130 on its outer end, and has a somewhat spherical surface 132 on its other end, the surface 132 being such as to contact the back face of the blades 116 just radially outward of their cutting edges throughout the limited pivotal movement of the blades, as caused by the axial movement of the guide sleeve through the bushing to open or spread the blades, against centrifugal force, and as the blades return to abutment with the bushing 126 under centrifugal force and during the withdrawal of the wire end during stripping. The spherical end 132 of the guide sleeve 128 serves to cause each of the two blades 116 to move equally, during opening and closing, and the sleeve may be actuated by a manually actuatable hinged plate 140 pivoted on the frame F as at 142, the plate having a large aperture 144 aligned with the sleeve aperture. The back side of the plate may have an annular Teflon bearing 146 to engage the rotating flange 130. By pressing the plate 140 toward the rotating head and face plate 49, the sleeve 128 is slid inwardly to open the blades 116. The insulated wire end is inserted to the stop 32, after which pressure on the plate 140 is removed, to allow centrifugal action to move the sleeve 128 to close the blades into engagement with the insulation, whereupon withdrawal of the conductor and further return of the sleeve, and the blades 116 into abutting relation with the bushing 126 cuts and strips a slug of insulation from the wire. Such stripping is under the influence of centrifugal force as well as the manual withdrawal of the wire, and the return movement of the guide sleeve which maintains equal movement of the blades during the stripping of the insulation from the wire end.

The movement of the plate 140 can be suitably limited by a stop 150 in the form of an adjustable and removable screw, and a small coil compression spring 152 may be interposed between the plate and frame. The guide sleeve 128 is readily replaced by sleeves having apertures of a diameter to suit the overall diameter of the wire insulation to be stripped, and the blades 116 will be adjusted so that their cutting edges will be equally spaced radially from the axis of rotation, and spaced apart by at least the diameter of the actual conductor. It will be seen that where two blades are employed, the opposed cutting edges are held diametrically opposite each other during the stripping by the sleeve end 132, so that the cutting edge 117 and the clearance face 119 of each blade supports the wire against the other blade, and the need for the support trough 60, as in the single blade version is eliminated.

It will be seen that the location of the weights 90 or 120 may be varied to suit conditions and the desired effectiveness, and the actual weight may also be varied, to suit conditions, such as the diameter of the housing, which limits the radius of gyration. Also the speed of rotation may be selected to provide a desired inertia yielding force.

Although two embodiments of the invention have been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A rotatable wire stripper adapted for motor drive comprising a rotatable face plate having a central axial aperture to receive from one end a terminal portion of an insulated conductor of an overall diameter approaching that of the aperture, said aperture at the other end terminating at least in part in a planar surface transverse to the axis of the aperture, a knife blade supported from the face plate by a pivot disposed on an axis lying laterally of and substantially in the plane of said surface, said knife blade having a cutting edge adapted to extend partially across the other end of the aperture by an amount approximating the thickness of insulation to be stripped and means responsive to centrifugal force from rotation affixed to and for urging said blade against said planar surface, said means comprising an inertia weight disposed on the opposite side of the axis of rotation from said blade.

2. A rotatable wire stripper comprising a rotatable face plate having a central axial aperture to receive from one end a terminal portion of an insulated conductor of an overall diameter approaching that of the aperture, said aperture at the other end terminating at least in part in a planar surface transverse to the axis of the aperture, a knife blade supported from the face plate by a pivot disposed on an axis lying laterally of and substantially in the plane of said surface, said knife blade having a cutting edge adapted to extend partially across the other end of the aperture by an mount approximating the thickness of insulation to be stripped and centrifugal means affixed to the blade and urging the blade edge to swing toward the planar surface including a weight disposed on the opposite side of the axis of rotation of the plate from the blade.

3. In a rotary wire stripper, a rotatable face plate, means having a cylindrical aperture therethrough of a diameter to receive the outside diameter of an insulated conductor end, said aperture being flared at the front face end, and being cut away on one side at the other end to form a step to receive a stripping jaw, and present a transverse step riser face to act as an abutment for a stripping jaw and to provide a semi-cylindrical trough to support a wire projecting through said step, a hinged stripping jaw pivoted laterally of said step essentially in the plane of said riser step, said jaw having a cutting edge extending parallel with the pivotal axis and adapted to abut said riser face, and centrifugal means affixed to and for urging said jaw toward said riser face having a weight disposed on the opposite side of the axis of rotation from said blade.

4. A stripper according to claim 3 having means for laterally adjusting said jaw to locate the cutting edge a radial distance from the axis of the aperture approximately the radius of the conductor portion of the insulated wire to be stripped.

5. A stripper according to claim 3 wherein the cylindrical aperture and step are part of a guide sleeve removably secured in the face plate.

6. A stripper according to claim 3 having means to limit movement of said jaw in a direction away from said riser face.

7. A rotary wire stripper comprising a face plate having an aperture therethrough, a guide sleeve of a length greater than the thickness of said plate having a cylindrical aperture and mounted for axial movement in said face plate aperture, and having a substantially spherical surface on its inner end, a pair of blade support plates mounted on opposite sides of the sleeve on the back inside surface of said face plate, a knife blade element pivoted on each of said support plates upon axes laterally spaced from said guide sleeve, and having cutting edges extending parallel with the pivotal blade axes, and lying across the guide sleeve aperture at its inner transverse surface when the cutting edges are in the plane of the pivot axes, means responsive to centrifugal force from rotation of said plate for urging each of said blades to a position with its forward face against the spherical transverse guide sleeve surface, and blade abutment surfaces exterior of said sleeve in the plane of the blade pivot axes for limiting blade movement in response to centrifugal force.

8. A stripper according to claim 7 having means to move each of the blade support plates laterally to position the cutting edge of its respective knife blade radially inward of the guide sleeve apertures by an amount approaching the thickness of insulation of the insulated wire to be stripped, when the cutting edges lie substantially in the plane of the blade pivot axes.

9. A wire stripper according to claim 1, wherein the means responsive to centrifugal force comprises an arm affixed to the blade and extending to the other side of the axis of plate rotation, and the inertia weight is on the end of the arm.

10. A wire stripper according to claim 9, wherein the arm has a tongue like extension disposed radially outward of the blade to engage face plate supported means and limit the pivotal movement of the blade away from the planar surface.

References Cited
UNITED STATES PATENTS

| | | | |
|---|---|---|---|
| 1,102,657 | 7/1914 | Hafner | 144—209 |
| 1,306,588 | 6/1919 | France | 81—9.51 X |
| 1,661,180 | 3/1928 | Johnson | 81—9.51 |
| 2,915,928 | 12/1959 | Felts et al. | 81—9.51 |
| 3,074,301 | 1/1963 | Carpenter | 81—9.51 |
| 3,153,958 | 10/1964 | Keys | 81—9.51 |

MILTON S. MEHR, *Primary Examiner.*